United States Patent
Shashikant Walawalkar

(10) Patent No.: US 12,122,891 B2
(45) Date of Patent: Oct. 22, 2024

(54) POLYMER COMPOSITION AND PROCESS FOR COATING EXPANDED POLYSTYRENE WITH THE POLYMER COMPOSITION

(71) Applicant: Deenar Shashikant Walawalkar, Mumbai (IN)

(72) Inventor: Deenar Shashikant Walawalkar, Mumbai (IN)

(73) Assignee: Verte Technologies, LLC, Salt Lake City, UT (US)

( * ) Notice: Subject to any disclaimer, the term of this patent is extended or adjusted under 35 U.S.C. 154(b) by 195 days.

(21) Appl. No.: 17/775,247

(22) PCT Filed: Nov. 4, 2020

(86) PCT No.: PCT/IB2020/060361
§ 371 (c)(1),
(2) Date: May 6, 2022

(87) PCT Pub. No.: WO2021/090198
PCT Pub. Date: May 14, 2021

(65) Prior Publication Data
US 2022/0389183 A1 Dec. 8, 2022

(30) Foreign Application Priority Data
Nov. 6, 2019 (IN) .............................. 201921045212

(51) Int. Cl.
*C08J 9/36* (2006.01)
*B05D 1/02* (2006.01)
(Continued)

(52) U.S. Cl.
CPC ................ *C08J 9/365* (2013.01); *B05D 1/02* (2013.01); *C08J 7/044* (2020.01); *C08L 25/06* (2013.01);
(Continued)

(58) Field of Classification Search
CPC ........ B05D 1/02; C08G 77/04; C08J 2325/06; C08J 2375/02; C08J 2375/04;
(Continued)

(56) References Cited

U.S. PATENT DOCUMENTS 4,861,628 A * 8/1989 Schucker ........... B01D 67/0048
502/4
7,928,160 B2 4/2011 Senkfor et al.
(Continued)

FOREIGN PATENT DOCUMENTS

AU 2020381197 11/2023
BR PI 10619615 A2 10/2011
(Continued)

*Primary Examiner* — Hai Vo
(74) *Attorney, Agent, or Firm* — David B. Tingey; K. Russell Griggs; Kirton McConkie

(57) ABSTRACT

A polymer composition for coating expanded polystyrene (EPS) is provided, the polymer composition includes a mixture of at least one of polyurea, polyurethane, silicon elastomer, and combination thereof in a predefined ratio. The polymer composition imparts desired properties such as high impact and abrasion resistance, elongation strength, and anti-static property along with flexural strength to the EPS. The present invention also provides the process for coating the polymer composition onto the EPS. The matrix coating process provides much stronger bonding due to overlap of coating of the polymer composition on the sides of the EPS and reduces the wastage of the polymer composition during the coating of the EPS. The present invention also provides the EPS coated with the polymer composition. The EPS coated with the polymer composition possesses the properties such as high impact resistance, abrasion resistance, elongation strength, flexural strength, and anti-static property.

14 Claims, 1 Drawing Sheet

(51) Int. Cl.
*C08J 7/044* (2020.01)
*C08L 25/06* (2006.01)

(52) U.S. Cl.
CPC ........ *C08J 2375/02* (2013.01); *C08J 2375/04* (2013.01); *C08J 2383/04* (2013.01); *C08J 2425/06* (2013.01)

(58) Field of Classification Search
CPC ................ C08J 2383/04; C08J 2425/06; C08J 2475/02; C08J 2475/04; C08J 2483/04; C08J 7/044; C08J 9/365; C08L 25/06; C08L 75/02; C08L 75/04; C08L 83/04
See application file for complete search history.

(56) References Cited

U.S. PATENT DOCUMENTS

| | | |
|---|---|---|
| 2010/0213631 A1 | 8/2010 | Tang et al. |
| 2010/0239815 A1 | 9/2010 | Senkfor et al. |
| 2011/0005435 A1 | 1/2011 | Renck et al. |
| 2014/0348776 A1 | 11/2014 | Palmer, Jr. et al. |
| 2016/0257444 A1* | 9/2016 | Wilhelm ............ B65D 19/0073 |
| 2016/0272774 A1* | 9/2016 | Snider .................... E04C 2/296 |
| 2018/0281276 A1* | 10/2018 | Milroy .................. B29C 64/124 |
| 2019/0083857 A1 | 3/2019 | Sullivan et al. |
| 2020/0347174 A1* | 11/2020 | Guest ..................... C08K 3/346 |

FOREIGN PATENT DOCUMENTS

| | | |
|---|---|---|
| CN | 101815744 A | 8/2010 |
| CN | 108407343 A | 8/2018 |
| CN | 109575337 A | 9/2020 |
| EP | 2695908 A2 | 2/2014 |
| EP | 3347419 A1 | 7/2018 |
| EP | 4085097 | 5/2021 |
| GB | 2489701 A | 10/2012 |
| GB | 2504763 A | 2/2014 |
| JP | H04325512 A | 11/1992 |
| JP | 1995179634 | 7/1995 |
| JP | 1997176570 | 7/1997 |
| JP | 1997208895 | 8/1997 |
| WO | 2006028732 A1 | 3/2006 |
| WO | 2011118910 A2 | 9/2011 |
| WO | 2017044735 A1 | 3/2017 |
| WO | 2018139677 | 8/2018 |
| WO | 2021090198 A1 | 5/2021 |
| WO | 2022043801 A1 | 3/2022 |
| WO | 2023077039 A1 | 5/2023 |

* cited by examiner

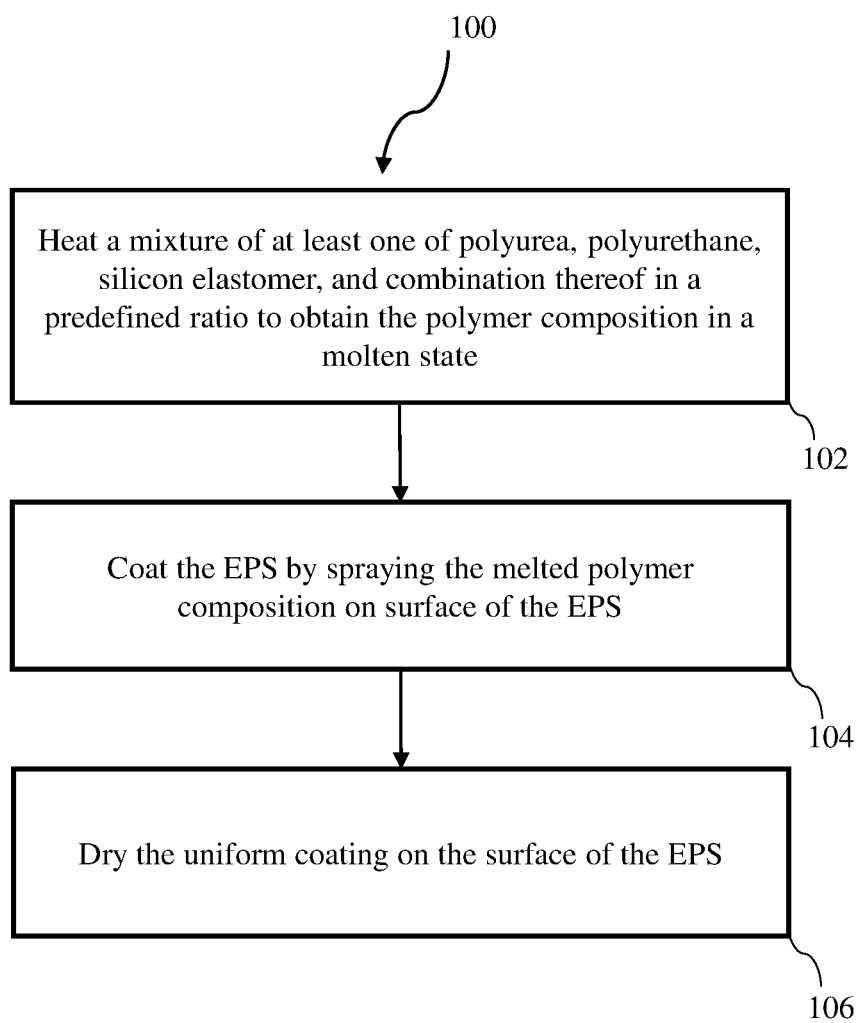

POLYMER COMPOSITION AND PROCESS FOR COATING EXPANDED POLYSTYRENE WITH THE POLYMER COMPOSITION

EARLIEST PRIORITY DATE

This application claims priority from a Provisional patent application filed in India having Patent Application No. 201921045212, filed on Nov. 6, 2019 and titled "A PROCESS FOR COATING AN EXPANDED POLYSTYRENE AND A PRODUCT THEREOF".

FIELD OF INVENTION

Embodiments of a present disclosure relate to coating an expanded polystyrene and more particularly to a polymer composition and process for coating expanded polystyrene (EPS) for imparting sturdiness and flexibility.

BACKGROUND

Expanded Polystyrene (EPS) is a white foam plastic material produced from solid beads of polystyrene. The EPS is primarily used for packaging, insulation and the like. Further, in insulation, energy efficiency is a primary feature wherein, the energy efficiency of insulation products such as EPS is measured in terms of R-value. Here, the R-value is a measure of resistance to heat flow which implies that, as the R-value increases, insulating capability also increases. So, in order to increase the R-value of the EPS, a layer of coating is applied to the EPS.

Furthermore, apart from energy efficiency, perm rating is another important feature in insulation. Here, the perm rating is a measure of a product's ability to let water vapor pass through it. The perm rating of the EPS without any coating is good. In applications wherein, the user wants to prevent water vapors to pass through a product, coated EPS is used having lower perm rating than the EPS without any coating.

Moreover, usage of EPS boxes without any coating for packaging, may cause easy break/crush of the EPS boxes and hence secondary packing like corrugated box may be needed. Thus, making the EPS box less reliable and less durable. There are different EPS coating techniques. One such technique is lamination technique.

In the lamination technique, a lamination of High Impact Polystyrene (HIPS) film is applied on the EPS surface to impart sturdiness and toughness. However, the HIPS film cannot be applied on complicated shapes and sizes thus, leaving some parts of the EPS surface without lamination. Further, the lamination technique is time consuming. Also, rejection rate is higher which increase the wastage and cost of operation. Thus, making the lamination technique less efficient and difficult to use.

Also, the coating compounds used for coating the EPS are aromatic in nature, therefore the compounds in the coating may react with ultraviolet rays when exposed to sunlight. This changes the color of the EPS to darker shades and even patches. Hence there is need for aliphatic compounds in coating composition for coating the EPS.

Recent studies have also depicted an aliphatic polymer coating on surface of the EPS. Such aliphatic polymer coating includes coating of polyurea or polyurethane on the surface of the EPS. However, use of the polyurea for the EPS coating makes a product expensive and the polyurethane is very sensitive to humidity conditions.

Hence, there is a need for an improved hybrid polymer composition and process for coating the EPS to address the aforementioned issues.

SUMMARY

In accordance with an embodiment of the present invention, a polymer composition for coating expanded polystyrene (EPS) is provided. The EPS includes a mixture of at least one of polyurea, polyurethane, silicon elastomer, and combination thereof in a predefined ratio. The mixture comprises one of the polyurea and the polyurethane in the predefined ratio of 60:40 to 80:20, and the polyurea, the polyurethane, and the silicon elastomer in the predefined ratio of 60:37:03 to 78:19:03. The polymer composition imparts desired properties such as high impact and abrasion resistance, elongation strength, and anti-static property along with flexural strength to the EPS.

In accordance with another embodiment of the present invention, a process for coating a polymer composition onto expanded polystyrene (EPS) is provided. The process includes heating a mixture of at least one of polyurea, polyurethane, silicon elastomer, and combination thereof in a predefined ratio at 70° C. to 85° C. to obtain the polymer composition in a molten state. The mixture comprises one of the polyurea and the polyurethane in the predefined ratio of 60:40 to 80:20, and the polyurea, the polyurethane, and the silicon elastomer in the predefined ratio of 60:37:03 to 78:19:03. The process also includes coating the EPS by spraying a layer of predefined thickness of the molten polymer composition on surface of the EPS. The coating of the EPS is carried using matrix coating process. The process also includes drying the coating on the surface of the EPS at a room temperature. The matrix coating process reduces wastage of the polymer composition during the coating of the EPS.

In accordance with yet another embodiment of the present invention, an expanded polystyrene (EPS) is provided. The EPS includes a layer of predefined thickness of the polymer composition coated on surface of the EPS. The polymer composition includes a mixture of at least one of polyurea, polyurethane, silicon elastomer, and combination thereof in a predefined ratio. The mixture comprises one of the polyurea and the polyurethane in the predefined ratio of 60:40 to 80:20, and the polyurea, the polyurethane, and the silicon elastomer in the predefined ratio of 60:37:03 to 78:19:03. The EPS coated with the polymer composition possesses the properties such as elongation strength, flexural strength, and anti-static property.

To further clarify the advantages and features of the present invention, a more particular description of the invention will follow by reference to specific embodiments thereof, which are illustrated in the appended figures. It is to be appreciated that these FIGURES depict only typical embodiments of the invention and are therefore not to be considered limiting in scope. The invention will be described and explained with additional specificity and detail with the appended figures.

BRIEF DESCRIPTION OF THE DRAWINGS

The disclosure will be described and explained with additional specificity and detail with the accompanying figures in which:

FIG. 1 is a flowchart (100) representing steps involved in a process for coating a polymer composition onto expanded polystyrene, in accordance with an embodiment of the present disclosure.

Further, those skilled in the art will appreciate that elements in the figures are illustrated for simplicity and may not have necessarily been drawn to scale. Furthermore, in terms of the method steps, chemical compounds, and parameters used herein may have been represented in the FIGURES by conventional symbols, and the FIGURES may show only those specific details that are pertinent to understanding the embodiments of the present disclosure so as not to obscure the FIGURES with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more components, compounds, and ingredients preceded by "comprises . . . a" does not, without more constraints, preclude the existence of other components or compounds or ingredients or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present invention relates to a polymer composition for coating an expanded polystyrene (EPS). The invention mainly focuses on a hybrid polymer composition which imparts flexural strength, elongation strength, and anti-static property to the expanded polystyrene (EPS). The invention also provides a process for coating the EPS. The process mainly involves matrix coating process for coating the EPS. Further the invention also relates to an expanded polystyrene (EPS) coated with a polymer composition.

As used herein the term 'expanded polystyrene (EPS)' refers to a white foam plastic material produced from solid beads of polystyrene. The EPS is primarily used for packaging, insulation etc.

In an embodiment, the polymer composition for coating expanded polystyrene (EPS) is provided. The polymer composition includes a mixture of at least one of polyurea, polyurethane, silicon elastomer, and combination thereof in a predefined ratio. The mixture comprises one of the polyurea and the polyurethane in the predefined ratio of 60:40 to 80:20, and the polyurea, the polyurethane, the silicon elastomer in the predefined ratio of 60:37:03 to 78:19:03. The polyurea is formed from a reaction between an isocyanate and enamine. The polyurethane is formed by the reaction between isocyanate and a polyol. The mixture of the polyurea and the polyurethane is configured to impart flexural strength and elongation strength to the EPS. The mixture of the polyurea, the polyurethane, and the silicon elastomer is configured to impart anti-static property along with flexural strength and elongation strength to the EPS. The polymer composition containing the mixture of the polyurea and the polyurethane in the predefined ratio of 65:35 imparts best results in strengthening the EPS. The polymer composition containing the mixture of the polyurea, the polyurethane, and the silicon elastomer in the predefined ratio of 65:32:03 imparts best results in providing anti-static properties to the EPS.

In the polymer composition including the polyurea and the polyurethane, reaction occurs between the isocyanate and blend of the polyol and the enamine. The enamine content helps in lowering the moisture sensitivity and the polyol content gives flexural strength. The mixture of polyurethane and polyurea imparts required hardness as well as elongation strength to the EPS.

The silicon elastomer is anti-static compound. The polymer composition including the polyurea, the polyurethane and the silicon elastomer provides anti-static property along with high impact and flexural strength to the EPS.

As used herein the term 'polyurea' refers to a type of elastomer that is derived from the reaction product of an isocyanate component and a synthetic resin blend component through step-growth polymerization.

As used herein the term 'polyurethane' refers to a polymer composed of organic units joined by carbamate (urethane) links.

As used herein the term 'silicon elastomer' refers to a durable & highly-resistant elastomer (rubber-like material) composed of silicone (polymer) containing silicon together with other molecule like carbon, hydrogen and oxygen. The silicon elastomer's structure always comprises siloxane backbone (silicon-oxygen chain) and an organic moiety bound to the silicon.

The polyurea and the polyurethane used in the polymer composition are aliphatic compounds. The aliphatic compound enables to prevent discoloration of the EPS, since aliphatic compounds do not react with UV rays from a sunlight. The coating of the aliphatic compound ensures the colouring of the EPS is not hampered specially for light colored EPS.

In another embodiment, a process for coating a polymer composition onto expanded polystyrene (EPS) is provided. The process mainly focuses on a matrix coating process for coating the EPS.

FIG. 1 is a flowchart (100) representing steps involved in the process for coating the polymer composition onto expanded polystyrene, in accordance with an embodiment of the present disclosure.

The process for coating the polymer composition onto expanded polystyrene begins with heating a mixture of at least one of polyurea, polyurethane, silicon elastomer, and combination thereof in a predefined ratio at 70° C. to 85° C. to obtain the polymer composition in a molten state at step 102. The mixture comprises one of the polyurea and the polyurethane in the predefined ratio of 60:40 to 80:20, and the polyurea, the polyurethane, and the silicon elastomer in the predefined ratio of 60:37:03 to 78:19:03. The polymer composition containing the mixture of the polyurea and the polyurethane in the predefined ratio of 65:35 imparts best results in strengthening the EPS. The polymer composition containing the mixture of the polyurea, the polyurethane, and the silicon elastomer in the predefined ratio of 65:32:03 imparts best results in providing anti-static properties to the EPS. In such embodiment, the mixture being heated to the temperature ranging between 70° C. to 85° C., to melt the mixture in order to obtain the polymer composition of uniform liquid consistency because the polyurea, the polyurethane, and the silicon elastomer are thermosets. In an exemplary embodiment, the heating of the mixture is carried at 80° C. to obtain a desired viscosity of the mixture for coating the polymer composition onto the EPS.

As used herein the term 'thermoset' refers to a polymer-based liquid or powder that becomes solid when heated, placed under pressure, treated with a chemical or via radiation. The curing process creates a chemical bond that, unlike a thermoplastic, prevents the material from being remelted.

The mixture of the polyurea and the polyurethane is configured to impart flexural strength and elongation strength to the EPS. The mixture of the polyurea, the polyurethane, and the silicon elastomer is configured to impart anti-static property along with flexural strength and elongation strength to the EPS.

In an embodiment, the EPS is coated by spraying a layer of predefined thickness of the molten polymer composition on surface of the EPS at step 104. The coating of the EPS is carried using matrix coating process. The spraying of the molten polymer composition on the surface of the EPS is carried using a gun controlled by one of a manual spray method and robotic arm. The predefined thickness of the layer of the polymer composition coated on the surface of the EPS ranges from 0.5 mm to 1 mm. The spraying the layer of predefined thickness of the molten polymer composition on the surface of the EPS is carried at a spray coating chamber.

In one embodiment, the predefined thickness of the layer of the polymer composition is uniform over the surface of the EPS. In such embodiment, the layer of the polymer composition is coated uniformly on the surface of the EPS.

In one embodiment, the predefined thickness of the layer of the polymer composition is variable over the surface of the EPS. In such embodiment, the layer of the polymer composition is coated on the surface of the EPS as per requirement.

In one embodiment, spraying the molten polymer composition on the surface of the EPS may include maintaining the temperature of the molten polymer composition between 70° C. to 85° C. In such embodiment, the temperature of the molten polymer composition is maintained between 70° C. to 85° C. in order to maintain viscosity of the molten polymer composition constant for proper coating.

In an embodiment, the coating is dried on the surface of the EPS at a room temperature at step 106. The coated EPS are dried for a duration of about 30 minutes naturally at room temperature.

The matrix coating process includes forming a matrix of at least four EPS pallets and spray coating in a specific manner. As used herein the term 'EPS pallet' refers to a structure of the EPS including predefined size and shape. Initially, the spray coating is done on a flat surface of the platform section and is allowed to dry for about 30 minutes, further to which an opposite side of the flat surface is spray coated in the same matrix form of the EPS pallets. In such an embodiment, a fixture is fabricated which may be configured to hold at least four EPS pallets. Further, the fixture may be taken to the spray coating chamber via a conveyer.

The spray coating chamber may include a side entry and exit sections which may be used for the coating of the at least four EPS pallets. In one embodiment, the chamber may be designed to accommodate four EPS pallets matrix. The coated EPS pallets are dried subsequently. For this purpose, fixture is designed to hold the at least four EPS pallets on the periphery and off centre to allow the coating to get sprayed on maximum area of the sides of the EPS pallet base of each of the at least four EPS pallets. The process includes shifting the fixture holding the at least four EPS pallets which are half coated for drying by the conveyer out of the spray coating chamber.

While the at least four EPS pallets which are half coated are kept for drying, a next set of EPS pallets may be brought in the spray coating chamber for spraying. Likewise, this cycle will repeat for a duration of about 30 minutes with average of 1.5 minutes per EPS pallet. Further, the previously coated at least four EPS pallets may be placed on the fixture with coated surface of the remaining sides of the pallets exposed to further coating. This will give an overlap from the sides to give stronger bonding. Again, the spraying process is repeated on the other side of the EPS pallet and then the set of fully coated EPS pallets is taken for natural drying.

In yet another embodiment, an expanded polystyrene (EPS) is provided. The EPS includes a layer of predefined thickness of the polymer composition coated on surface of the EPS. The polymer composition comprises a mixture of at least one of polyurea, polyurethane, silicon elastomer, and combination thereof in a predefined ratio. The mixture comprises one of the polyurea and the polyurethane in the predefined ratio of 60:40 to 80:20, and the polyurea, the polyurethane, and the silicon elastomer in the predefined ratio of 60:37:03 to 78:19:03. The polymer composition containing the mixture of the polyurea and the polyurethane in the predefined ratio of 65:35 imparts best results in strengthening the EPS. The polymer composition containing the mixture of the polyurea, the polyurethane, and the silicon elastomer in the predefined ratio of 65:32:03 imparts best results in providing anti-static properties to the EPS.

The layer of predefined thickness formed by the mixture of the polyurea and the polyurethane is configured to impart flexural strength and elongation strength to the EPS. The layer of predefined thickness formed by the mixture of the polyurea, the polyurethane, and the silicon elastomer is configured to impart anti-static property along with flexural strength and elongation strength to the EPS. The predefined thickness of the layer of the polymer composition coated on the surface of the EPS ranges from 0.5 mm to 1 mm.

The present invention enables polymer coating of the EPS. The polymer composition provided by the present invention impart desired properties such as high impact and abrasion resistance, elongation strength, and anti-static property along with flexural strength to the EPS. The use of aliphatic compound in the polymer composition enables to prevent discoloration of the EPS. The present invention also provides the process for coating the polymer composition onto the EPS. The process includes the matrix coating process for coating the polymer composition onto the EPS which provides much stronger bonding due to overlap of coating of the polymer composition on the sides of the EPS and reduces the wastage of coating material i.e. the polymer composition. The present invention also provides the EPS coated with the polymer composition. The EPS coated with the polymer composition possesses the properties such as high impact resistance, abrasion resistance, elongation strength, flexural strength, and anti-static property.

While specific language has been used to describe the invention, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A coated expanded polystyrene (EPS) pallet, comprising:
   an EPS pallet substrate; and
   a polymer composition that is coated on a surface of the EPS pallet substrate, wherein the polymer composition comprises a polyurea, a polyurethane, and a silicon elastomer in a ratio of 60:37:03 to 78:19:03.

2. The coated EPS pallet of claim 1, wherein the polymer composition comprises the polyurea, the polyurethane, and the silicon elastomer in a ratio of 65:32:03.

3. The coated EPS pallet of claim 1, wherein the polymer composition is coated on the surface of the EPS pallet substrate at a thickness of 0.5 mm to 1 mm.

4. A coated expanded polystyrene (EPS) pallet, comprising:
   an EPS pallet substrate; and
   a layer of a polymer composition coated on a surface of the EPS pallet substrate, wherein the polymer composition comprises a polyurea, a polyurethane, and a silicon elastomer at a ratio of 60:37:03 to 78:19:03.

5. The coated EPS pallet of claim 4, wherein the polymer composition comprises the polyurea, the polyurethane, and the silicon elastomer in a ratio of 65:32:03.

6. The coated EPS pallet of claim 4, wherein the layer of the polymer composition has a thickness that ranges from 0.5 mm to 1 mm.

7. A process for preparing a coated expanded polystyrene (EPS) pallet, the process comprising:
   heating a polymer composition at 70° C. to 85° C. to obtain the polymer composition in a molten state, wherein the polymer composition comprises a polyurea, a polyurethane, and a silicon elastomer in a ratio of 60:37:03 to 78:19:03; and
   providing a coating on a surface of the EPS pallet with the polymer composition in the molten state to form a coating layer on the surface of the EPS pallet.

8. The process of claim 7, wherein the polymer composition comprises the polyurea, the polyurethane, and the silicon elastomer in a ratio of 65:32:03.

9. The process of claim 7, wherein a thickness of the coating layer ranges from 0.5 mm to 1 mm.

10. The process of claim 7, wherein providing the coating on the surface of the EPS pallet with the polymer composition in the molten state is performed using a matrix coating process.

11. The process of claim 7, wherein providing the coating on the surface of the EPS pallet with the polymer composition in the molten state includes spraying the polymer composition in the molten state on the surface of the EPS pallet using a gun controlled by one of a manual spray method and a robotic arm.

12. The process of claim 7 wherein a thickness of the coating layer is uniform over the surface of the EPS pallet.

13. The process of claim 7, wherein a thickness of the coating layer is varied over the surface of the EPS pallet.

14. The process of claim 7, further comprising drying the coating on the surface of the EPS pallet at a room temperature.

* * * * *